(12) United States Patent
Morinaga et al.

(10) Patent No.: US 9,181,445 B2
(45) Date of Patent: Nov. 10, 2015

(54) NON-AQUEOUS INKJET INK

(71) Applicant: RISO KAGAKU CORPORATION, Tokyo (JP)

(72) Inventors: Marie Morinaga, Ibaraki (JP); Kazuya Kawakami, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 0 days.

(21) Appl. No.: 14/399,380

(22) PCT Filed: Oct. 12, 2012

(86) PCT No.: PCT/JP2012/006554
§ 371 (c)(1),
(2) Date: Nov. 6, 2014

(87) PCT Pub. No.: WO2013/168205
PCT Pub. Date: Nov. 14, 2013

(65) Prior Publication Data
US 2015/0094408 A1    Apr. 2, 2015

(30) Foreign Application Priority Data
May 9, 2012  (JP) ................. 2012-107234

(51) Int. Cl.
*C09D 11/322* (2014.01)
*C09D 11/36* (2014.01)
*C08K 5/3447* (2006.01)

(52) U.S. Cl.
CPC .............. *C09D 11/322* (2013.01); *C09D 11/36* (2013.01); *C08K 5/3447* (2013.01)

(58) Field of Classification Search
CPC ..... C09D 11/322; C09D 11/36; C08K 5/3447

USPC .............. 106/31.6, 31.78, 31.79, 31.8, 31.81
See application file for complete search history.

(56) References Cited

U.S. PATENT DOCUMENTS

| | | | |
|---|---|---|---|
| 5,795,376 A | 8/1998 | Ide | |
| 8,741,047 B2* | 6/2014 | Morinaga et al. | 106/31.6 |
| 2005/0223939 A1* | 10/2005 | Uozumi et al. | 106/31.58 |
| 2007/0263018 A1* | 11/2007 | Vanini | 347/1 |
| 2008/0312358 A1* | 12/2008 | Deroover et al. | 523/333 |
| 2010/0029813 A1* | 2/2010 | Deroover et al. | 524/93 |
| 2012/0056929 A1* | 3/2012 | Sao et al. | 347/20 |

FOREIGN PATENT DOCUMENTS

| | | |
|---|---|---|
| JP | 7-331101 A | 12/1995 |
| JP | 10-60330 A | 3/1998 |
| JP | 2000-044856 A | 2/2000 |
| JP | 2005-187577 A | 7/2005 |
| JP | 2010-084066 A | 4/2010 |
| JP | 2012-203144 A | 10/2012 |

OTHER PUBLICATIONS

Dye/Dye intermediates/ Fluorescent Brightener/pigment dye/Pigment Red 48; Nov. 2012; 2 pages.*
English translation of JP 2010/084066; 24 pages; Apr. 2010.*
English translation of JP 2005/187577; 9 pages; Jul. 2005.*
International Search Report issued in PCT/JP2012/006554 mailed on Feb. 5, 2013 (3 pages).
Written Opinion of the International Searching Authority issued in PCT/JP2012/006554 mailed on Feb. 5, 2013 (4 pages).

* cited by examiner

Primary Examiner — Helene Klemanski
(74) Attorney, Agent, or Firm — Osha•Liang LLP

(57) ABSTRACT

A non-aqueous inkjet ink containing at least two kinds of color pigments, a pigment dispersing agent and an organic solvent, wherein the two kinds of color pigments are a watching red pigment and a benzimidazolone pigment.

4 Claims, No Drawings

NON-AQUEOUS INKJET INK

CROSS-REFERENCE TO RELATED APPLICATIONS

This application is a national phase entry of PCT International Application No. PCT/JP2012/006554filed on Oct. 12, 2012, which claim priority under 35 U.S.C. §119(a) to Japanese Patent Application No.2012-107234 filed on May 9, 2012. Each of the above applications is hereby expressly incorporated by reference, in its entirety, into the present application.

TECHNICAL FIELD

The present invention relates to a non-aqueous inkjet ink suitable for use in an inkjet recording system.

BACKGROUND ART

The inkjet recording system is a printing system in which a liquid ink having high fluidity is ejected from a fine nozzle and attached on a recording medium, for example, paper, to perform printing. The system has a feature in that an image having high resolution and high quality can be printed at a high speed and with a low noise using a relatively inexpensive device and has rapidly become widespread. Since a colorant of the ink used in the inkjet recording system is superior in light fastness, weather fastness and water resistance required for high image quality printing, inks containing pigment as the colorant are increasing.

Color printing in inkjet recording is ordinarily performed by expressing various hues by using a three color ink set composed of pigment inks of the three colors yellow (Y), magenta (M) and cyan (C) which are the three primary colors in subtractive color mixing, or a four color ink set that includes black (K) in addition to these three colors. Since pigments may differ in the structure, surface treatment or particle size thereof; when two kinds of pigments are used in one ink (for example, Y ink), dispersion states of the pigments change, leading to deterioration of storage stability, and causing changes in tint. Therefore, a single pigment is ordinarily used in the respective inks of Y, M, C and K.

In aqueous inks, on the other hand, it has been attempted to use plural kinds of pigments in one ink from the standpoints of color-forming property and glossiness. For example, in Patent Document 1, it is described that the color-forming property of an aqueous ink is improved by using a mixture of pigment dispersions dispersed by different dispersion means. Also, in Patent Document 2, it is described that the glossiness in the case of printing on glossy paper is improved by microencapsulation of a pigment mixture composed of plural kinds of organic pigments using a resin having a dispersing function.

PRIOR ART DOCUMENTS

Patent Documents

Patent Document 1: Japanese Unexamined Patent Publication No. 2005-187577
Patent Document 2: Japanese Unexamined Patent Publication No. 2010-084066

DISCLOSURE OF THE INVENTION

Problems that the Invention is to Solve

There is a problem in that since aqueous inks tend to cause a greater amount of curling in comparison with non-aqueous inks, a drying process is required. Therefore, a complicated mechanism is necessary in order to perform conveyance at a high speed, and cost becomes high. For this reason, in the market where demand for high speed printing is large, demand to use non-aqueous inks is high. Also, there is demand to print with only two colors, for example, black and vermillion, for the purpose, for example, of decreasing the printing costs. Further, since a color expression range is narrow with a conventional three color or four color ink set, there is demand to expand the color expression range.

However, since non-aqueous inks have a poor separation property between a colorant and a solvent when compared to aqueous inks and the colorant is apt to penetrate into paper together with the solvent, it is difficult for the colorant to remain on the paper surface. For this reason, even when two or more kinds of pigments are combined to tone, there is a problem that image density and chroma decrease in non-aqueous inks. For example, when it is intended to form vermillion by toning M ink and Y ink in a conventional four color ink set, only a strong bluish tone and a tint of low chroma can be formed. Moreover, there is a problem that in the case of forming a mixed color, a color reproduction range is narrowed.

When the proportion that pigment occupies in ink is increased, although printed materials having a high image density are obtained, chroma is further reduced. This phenomenon is significantly observed, in particular, in non-aqueous inks which are apt to penetrate into paper, particularly, plain paper, in comparison with aqueous inks. The increase in the proportion that pigment occupies in ink also results in degradation of pigment dispersion stability and storage stability. When the proportion of a dispersing agent is increased, although it is possible to improve the pigment dispersion stability, viscosity is increased and there is a risk of causing clogging in a nozzle of an inkjet device.

The present invention has been made in view of the circumstances described above and an object of the invention is to provide a non-aqueous inkjet ink which enables printing with high chroma and has good storage stability.

Means for Solving the Problems

A non-aqueous inkjet ink according to the invention is a non-aqueous inkjet ink containing at least two kinds of color pigments, a pigment dispersing agent and an organic solvent, wherein the color pigments are a watching red pigment and a benzimidazolone pigment.

The watching red pigment is preferably at least one of C. I. Pigment Red 48:1 and C. I. Pigment Red 48:3.

The benzimidazolone pigment is preferably C. I. Pigment Yellow 180.

Advantage of the Invention

Since the non-aqueous inkjet ink according to the invention is a non-aqueous inkjet ink containing at least two kinds of color pigments, a pigment dispersing agent and an organic solvent, wherein the two kinds of color pigments are a watching red pigment and a benzimidazolone pigment, a vermillion printed material of high chroma can be obtained and the ink can be that which has good storage stability.

According to an ink set comprising a combination of the non-aqueous inkjet ink according to the invention and at least one non-aqueous inkjet ink selected from a cyan ink, a magenta ink, a yellow ink and a black ink, since the chroma of the non-aqueous inkjet ink according to the invention is improved, color gamut, which is the color expression range, can be widened in the case of a mixed color.

BEST MODE FOR CARRYING OUT THE INVENTION

The non-aqueous inkjet ink according to the present invention is a non-aqueous inkjet ink (hereinafter, also simply referred to as an ink) containing at least two kinds of color pigments, a pigment dispersing agent and an organic solvent, wherein the two kinds of color pigments are a watching red pigment and a benzimidazolone pigment.

The watching red pigment is C. I. Pigment Red 48. Specific examples include C. I. Pigment Red 48:1, C. I. Pigment Red 48:2, C. I. Pigment Red 48:3, C. I. Pigment Red 48:4 and C. I. Pigment Red 48:5. The watching red pigments may be used either individually or as an appropriate mixture. From the standpoint of dispersibility and stability, it is more preferable for the watching red pigment to be at least one of C. I. Pigment Red 48:1 and C. I. Pigment Red 48:3.

The benzimidazolone pigment includes, for example, P. Y. 180, P. Y. 175, P. Y. 154, P. Y. 151, P. Y. 120, P. Y. 181 and P. Y. 194. The benzimidazolone pigments may be used either individually or as an appropriate mixture. From the standpoint of dispersibility and stability, it is more preferable for the benzimidazolone pigment to be P. Y. 180.

The benzimidazolone pigment has a mono-azo or dis-azo structure, and it is believed that one reason that enables storage stability to be secured is that the structure thereof is close to the structure of the watching red pigment. When Pigment Red 122 (quinacridone), Pigment Red 146 or Pigment Red 269 (naphthol), which is widely employed as a magenta pigment, is used in place of the watching red pigment, the storage stability cannot be secured and high chroma is not obtained. When Pigment Red 57:1 (Brilliant Carmine 6B) is used in place of the watching red pigment, although the storage stability can be secured, high chroma is not obtained. Although the chroma and coloring power may somewhat vary depending on the kind of the benzimidazolone pigment, the differences due to the watching red pigment are extremely large and it is believed that the watching red pigment is effective as far as the tint and chroma are concerned.

A mixing ratio (% by mass ratio) of the watching red pigment and the benzimidazolone pigment is preferably from 90:10 to 10:90, more preferably from 90:10 to 20:80, and still more preferably from 90:10 to 50:50. When the mass ratio of the benzimidazolone pigment is too large, the chroma will be too high and the difference in the chroma based on the change in the mass ratio will be difficult to visually recognize. The total amount of the pigments is preferably from 1 to 30% by mass, more preferably from 3 to 20% by mass, still more preferably from 5 to 15% by mass, with respect to the total amount of the ink.

In the ink according to the invention, the chroma and brightness can be finely adjusted by incorporating thereinto various known pigments other than the watching red pigment and the benzimidazolone pigment. As such a pigment, although various known pigments may be used, carbon black is preferred because fine adjustments can be performed with small amounts. The carbon black preferably includes, for example, furnace black, lamp black, acetylene black and channel black. The content of the carbon black is preferably 1.0% by mass or less and more preferably 0.6% by mass or less with respect to the total amount of the pigment. An excessively large addition amount thereof is not preferred because the chroma will be severely reduced.

The organic solvent for use in the ink according to the invention is not particularly limited and a conventionally known solvent, for example, a nonpolar organic solvent and a polar organic solvent may be used. The solvents may be used individually or as a mixture of two or more thereof. In the case that a mixture of two or more organic solvents is used, it is necessary for the mixed solution to form a single continuous phase.

Nonpolar organic solvents include a hydrocarbon solvent, such as an aliphatic hydrocarbon solvent, an alicyclic hydrocarbon solvent, and an aromatic hydrocarbon solvent. Examples of the aliphatic hydrocarbon solvent and alicyclic hydrocarbon solvent include TECLEAN N-16, TECLEAN N-20, TECLEAN N-22, NO. 0 SOLVENT L, NO. 0 SOLVENT M, NO. 0 SOLVENT H, AF-4, AF-5, AF-6, AF-7, ISOSOL 200, ISOSOL 300, ISOSOL 400, NAPHTESOL 160, NAPHTESOL 200 and NAPHTESOL 220 (all of which are trade names) produced by JX Nippon Oil & Energy Corp., and ISOPAR G, ISOPAR H, ISOPAR L, ISOPAR M, EXXSOL D40, EXXSOL D80, EXXSOL D100, and EXXSOL D140 (all of which are trade names) produced by Exxon Mobil Corp.

As the polar organic solvent, an ester solvent, an alcohol solvent, a higher fatty acid solvent, an ether solvent and a mixed solvent thereof can be used. For example, at least one solvent selected from the group consisting of an ester solvent, which is an ester of a higher fatty acid having from 8 to 20 carbon atoms and an alcohol having from 1 to 24 carbon atoms, a higher alcohol having from 8 to 24 carbon atoms and a higher fatty acid having from 8 to 20 carbon atoms is preferably used. Examples of the ester solvent include, for example, methyl laurate, isopropyl laurate, hexyl laurate, isopropyl myristate, isopropyl palmitate, isostearyl palmitate, methyl oleate, ethyl oleate, isopropyl oleate, butyl oleate, methyl linoleate, isobutyl linoleate, ethyl linoleate, isopropyl isostearate, soybean oil methyl ester, soybean oil isobutyl ester, tall oil methyl ester, tall oil isobutyl ester, diisopropyl adipate, diisopropyl sebacate, diethyl sebacate, propylene glycol monocaprate, trimethyloipropane tri-2-ethylhexanoate and glycerol tri-2-ethylhexanoate.

Examples of the alcohol solvent include isomyristyl alcohol, isopalmityl alcohol, isostearyl alcohol and oleyl alcohol.

Examples of the higher fatty acid solvent include isononanoic acid, isomyristic acid, isopalmitic acid, oleic acid and isostearic acid.

In addition to the organic solvent described above, a water-soluble organic solvent may be added to the ink according to the invention in a range where the water-soluble organic solvent is miscible with the organic solvent described above to form the single continuous liquid phase. The water-soluble organic solvent is not particularly limited, and a conventionally known organic solvent, for example, a lower alcohol may be used.

The pigment dispersing agent is not particularly limited as long as it is able to stably disperse the pigments used in the solvent. In particular, a polymer dispersing agent is preferably used. For example, a hydroxy group-containing carboxylic acid ester, a salt of a long chain polyaminoamide and a high molecular weight acid ester, a salt of high molecular weight polycarboxylic acid, a salt of a long chain polyaminoamide and a polar acid ester, a high molecular weight unsaturated acid ester, a high molecular copolymer, a modified polyurethane, a modified polyacrylate, a polyether ester type anionic active agent, a salt of naphthalenesulfonic acid formalin condensate, a polyoxyethylene alkyl phosphoric acid ester, polyoxyethylene nonylphenyl ether, a polyester polyamine and stearylamine acetate are preferably used. Among the dispersing agents, a polymer dispersing agent is preferably used. The dispersing agents may be used individually or as a combination of plural kinds thereof.

Specific examples of commercially available pigment dispersing agents include SOLSPERSE 13940 (polyester amine type), 17000, 18000 (aliphatic amine type), 11200, 22000, 24000 and 28000 (all of which are trade names) produced by Lubrizol Japan Ltd., FLOWLEN DOPA-15B (trade name) produced by Kyoeisha Chemical Co., Ltd., DA-703-50, DA-7300 and DA234 (all of which are trade names) produced by Kusumoto Chemicals, Ltd., DISPERBYK-101 (trade name) produced by BYK-Chemie GmbH, HINOACT (trade name) produced by Kawaken Fine Chemicals Co., Ltd., ANTARON V-216, GANEX V-216, ANTARON V-220 and GANEX V-220 (all of which are trade names) produced by ISP Corporation, and UMIMER U-151, and UNIMER U-15 (all of which are trade names) produced by Induchem Co.

In addition to the respective components described above, the ink according to the invention may also contain commonly used additives. Examples of the additives include a surfactant, for example, an anionic, cationic, amphoteric or a nonionic surfactant and an antioxidant, for example, dibutyl hydroxy toluene, propyl gallate, tocopherol, butylhydroxyanisole or nordihydroguaiaretic acid.

The ink according to the invention may be prepared by charging all components collectively or separately in a known dispersing machine, for example, a beads mill, to be dispersed and, if desired, passed through a known filtration machine, for example, a membrane filter.

As to the viscosity of the ink, an adequate range thereof may vary depending on a nozzle diameter of inkjet head, ejection surroundings or the like, and it is preferably from 5 to 30 mPa·s and more preferably from 5 to 15 mPa·s at 23° C. The viscosity represents a value measured at 10 Pa when the shear stress is increased from 0 Pa at a rate of 0.1 Pa/s at 23° C.

Since the ink according to the present invention is capable of printing with high image density and high chroma, it can be favorably used in a line-type inkjet system that forms an image with one pass, which enables high-speed printing. Also, since the chroma of the ink according to the present invention is improved, the color gamut, which is the color expression range, can be widened even in the case of a mixed color so that it can be favorably used in combination with at least one non-aqueous inkjet ink selected from a cyan ink, a magenta ink, a yellow ink and a black ink to form a non-aqueous ink set for inkjet printer.

The ink set as used herein includes a case where a plurality of individual ink cartridges are used in combination as well as an ink cartridge in which plural ink cartridges are integrated, and also includes an integrated product of the ink cartridge and a recording head.

Hereinafter, examples of the non-aqueous inkjet ink according to the invention will be described.

EXAMPLES

Ink raw materials were mixed in the proportions shown in Table 1 below (the numerical value shown in Table 1 being represented by parts by mass), zirconia beads (diameter: 0.5 mm) were added thereto, and the mixture was dispersed for 120 minutes using a rocking mill (produced by Seiwa Giken Co., Ltd.). After the dispersion, the zirconia beads were removed and the dispersions were filtered sequentially through 3.0 μm and 0.8 μm membrane filters to remove contaminants and coarse particles, thereby preparing ink compositions.

Examples and Comparative Examples

The prepared ink compositions were mixed in the proportions shown in Table 2 to prepare inks for the examples and comparative examples. Using the prepared inks, printing was carried out by an inkjet system in which printing is performed with one pass of a line type head using a head (CB2 Head, produced by Toshiba TEC Corp.) on plain paper (RISO Paper Thin Type, produced by Riso Kagaku Corp.) to produce printed materials.

(Evaluations)
(Ink Viscosity)

The ink viscosity is a viscosity measured at 10 Pa when shear stress is increased from 0 Pa at a rate of 0.1 Pa/s at 23° C. It was measured by a controlled stress rheometer RS75 produced by Haake Technik GmbH (cone angle: 1°, diameter: 60 mm). The unit of the viscosity shown in Table 2 is mPa·s.

(Storage Stability)

The prepared ink was placed in a sealed container and left to stand in an environment of 70° C. for 4 weeks. Then, changes in viscosity of the ink were measured and the measurement results were evaluated in the manner shown below.

Rate of change in viscosity: [(Viscosity after 4 weeks×100)/(Initial value of viscosity)]−100 (%)

A: The rate of change in viscosity is less than 10%.
B: The rate of change in viscosity is 10% or more.

(Chroma)

One day after the production of the printed materials, the chroma thereof was measured using Color Analyzer TC-1800MK-II produced by Tokyo Denshoku Co., Ltd., and the measurement results were evaluated according to the criteria shown below. The chroma is represented by the formula shown below according to the definition of CIE (1976) L*a*b* color space by the International Commission on Illumination.

$$\text{Chroma } c^* = \{(a^*)^2 + (b^*)^2\}^{1/2}$$

A: Difference in the chroma from that of Comparative Example 1 is 10 or more.
B: Difference in the chroma from that of Comparative Example 1 is 3 to less than 10.
C: Difference in the chroma from that of Comparative Example 1 is less than 3.

The evaluation results of the respective inks are shown in Table 2.

TABLE 1

| | | Composition A | Composition B | Composition C | Composition D | Composition E | Composition F |
|---|---|---|---|---|---|---|---|
| Pigment | P.R. 48:1 (LITHOL SCARLET D3700, produced by BASF) | | 5.0 | | | | |
| | P.R. 48:1 (80%) + P.R. 48:3 (20%) (FUJI RED 5R 734, produced by Fuji Pigment Co., Ltd.) | 5.0 | | | | | |
| | P.R. 57:1 (SYMULER BRILLIANT CARMINE 6B321, produced by DIC Corp. | | | 5.0 | | | |
| | P.R. 122 (FASTOGEN SUPER MAGENTA RH, produced by DIC Corp. | | | | 5.0 | | |
| | P.Y. 180 (TONER YELLOW HG, produced by Clariant (Japan) K.K. | | | | | 5.0 | |
| | Carbon Black (MA11, produced by Mitsubishi Chemical Corp.) | | | | | | 5.0 |
| Dispersing Agent | SOLSPERSE 11200 (produced by Lubrizol Japan Ltd.) | 2.5 | 2.5 | 2.5 | 2.5 | 2.5 | 2.5 |
| Solvent | Isooctyl Palmitate (NIKKOL IOP, produced by Nikko Chemicals Co., Ltd.) | 42.5 | 42.5 | 42.5 | 42.5 | 42.5 | 42.5 |
| | AF-4 (AF Solvent No. 4, produced by JX Nippon Oil & Energy Corp.) | 40.0 | 40.0 | 40.0 | 40.0 | 40.0 | 40.0 |
| | Isomyristyl Alcohol (FOC140N, produced by Nissan Chemical Industries, Ltd.) | 10.0 | 10.0 | 10.0 | 10.0 | 10.0 | 10.0 |
| | Total | 100.0 | 100.0 | 100.0 | 100.0 | 100.0 | 100.0 |

TABLE 2

| | | Example 1 | Example 2 | Example 3 | Example 4 | Example 5 | Example 6 | Example 7 | Example 8 | Comparative Example 1 | Comparative Example 2 | Comparative Example 3 | Comparative Example 4 |
|---|---|---|---|---|---|---|---|---|---|---|---|---|---|
| Mixing Ratio | Composition A | 90 | | 80 | 70 | 30 | 10 | 89.46 | 89.1 | | | | |
| | Composition B | | 90 | | | | | | | | | | |
| | Composition C | | | | | | | | | 90 | 30 | 10 | |
| | Composition D | | | | | | | | | | | | 10 |
| | Composition E | 10 | 10 | 20 | 30 | 70 | 90 | 9.94 | 9.9 | 10 | 70 | 90 | 90 |
| | Composition F | | | | | | | 0.60 | 1.0 | | | | |
| Evaluation | Chroma | A | A | A | A | B | B | A | B | C | C | C | C |
| | Stability | A | A | A | A | A | A | A | A | A | A | A | B |
| | Viscosity | 10.1 | 10.2 | 10.1 | 10.0 | 9.9 | 9.9 | 10.1 | 10.0 | 10.3 | 10.2 | 10.1 | 12.5 |

As shown in Table 2, the inks of Examples 1 to 6 provided good chroma and also secured storage stability. Further, the inks of Examples 7 and 8 provided good chroma even though they contained the carbon black pigment. In Examples 5 and 6, the chroma was somewhat reduced due to the increase in the content of the benzimidazolone pigment. In contrast, the inks of Comparative Examples of 1 to 3 using Pigment Red 57:1 (Brilliant Carmine 6B) in place of the watching red pigment secured storage stability, but did not provide sufficient chroma. Also, in Comparative Example 4 using Pigment Red 122 (quinacridone) in place of the watching red pigment, storage stability was not secured and also sufficient chroma was not provided.

The invention claimed is:

1. A non-aqueous inkjet ink containing at least two kinds of color pigments, a pigment dispersing agent and an organic solvent, wherein the color pigments are a watching red pigment and a benzimidazolone pigment.

2. The non-aqueous inkjet ink as claimed in claim 1, wherein the watching red pigment is at least one of C. I. Pigment Red 48:1 and C. I. Pigment Red 48:3.

3. The non-aqueous inkjet ink as claimed in claim 1, wherein the benzimidazolone pigment is C. I. Pigment Yellow 180.

4. The non-aqueous inkjet ink as claimed in claim 2, wherein the benzimidazolone pigment is C. I. Pigment Yellow 180.

\* \* \* \* \*